United States Patent [19]

Halpern

[11] Patent Number: 4,906,828

[45] Date of Patent: Mar. 6, 1990

[54] ELECTRONIC MONEY PURSE AND FUND TRANSFER SYSTEM

[75] Inventor: John W. Halpern, London, England

[73] Assignee: Paperless Accounting, Inc., Washington, D.C.

[21] Appl. No.: 201,339

[22] Filed: May 31, 1988

Related U.S. Application Data

[63] Continuation of Ser. No. 470,689, Feb. 28, 1983, abandoned.

[51] Int. Cl.$^4$ .............................................. G06F 15/30
[52] U.S. Cl. ................................... 235/379; 235/380; 235/492; 902/2; 380/24
[58] Field of Search ............... 235/379, 380, 381, 438, 235/492; 902/2; 380/24

[56] References Cited

U.S. PATENT DOCUMENTS

| | | | |
|---|---|---|---|
| 3,655,946 | 4/1972 | Morita et al. | 235/380 |
| 4,001,550 | 1/1977 | Schatz | 235/492 X |
| 4,271,482 | 6/1981 | Girand | 235/380 X |
| 4,360,727 | 11/1982 | Lehmann | 235/492 X |
| 4,439,670 | 3/1984 | Basset et al. | 235/380 X |
| 4,453,074 | 6/1984 | Weinstein | 235/380 X |
| 4,471,216 | 9/1984 | Herve | 235/380 |
| 4,473,825 | 9/1984 | Walton | 235/380 X |
| 4,498,000 | 2/1985 | Decavele et al. | 235/492 X |

FOREIGN PATENT DOCUMENTS 2102606 2/1983 United Kingdom ................. 380/24

Primary Examiner—David L. Trafton
Attorney, Agent, or Firm—Burns, Doane, Swecker & Mathis

[57] ABSTRACT

The essence of the invention is a socalled "data bit variable spacer generator", block 79, which contributes to the generation of a control output "c" from a combinatory logic circuit group 78. The logic level of "c" determines whether a clear data bit from the parity flip flop FF6 is to be sent out or a random bit from block RMG. The 'variable data bit generator' is controlled by a number of parallel bit outputs from registers SH1 and SH2 which hold an encryption key after being conditioned by other logic inputs derived from key parity flip flops (FF1 and FF2) and clear data bit levels from block 81. Registers SH1 and SH2 shift and recirculate when the 'c' output is high. Similar principles are used when data are decrypted. The circuit is suitable for integration with other functions on a single substrate chip.

43 Claims, 10 Drawing Sheets

ELECTRONIC MONEY PURSE AND FUND TRANSFER SYSTEM

This application is a continuation, of application Ser. No. 470,689, filed Feb. 28, 1983, now abandoned.

The invention relates to the general field of tamper-proof electronic transfer of confidential data between a card-like data carrier component and a terminal. Numerous ideas have appeared in this field over the past fourteen years; examples are GB No. 1,314,021 of 1969, GB Nos. 2,057,740 and 2,075,732, U.S. Pat. Nos. 3,870,866 and 3,906,460 besides others by different authors.

Insofar as these various techniques are also applied or expected to be applied to moneyless payment transactions they were prompted by the conviction that in many a service field the traditional money as a means of value transfer is not only inefficient and loaded with overheads but increasingly often becomes an rightout impediment to the service itself. And, if a satisfactory form for an "electronic money carrier" could be found, such innovation could have healthy repercussions on the streamlining and cost reduction of numerous public and semi-public services and vending transactions.

There exist published descriptions of debit cards from which a prepaid credit can be deducted for specific purposes, and which upon exhaustion, are thrown away. Rechargable cards where also conceived and descriptions published. But none can be said to fulfill the manifold stringent requirements of an electronic container of purchase entitlements, or 'money purse'.

It is the purpose of this invention, on a systematic basis to embody in a single design such features as will satisfy, among others, the following conditions:

(a) tapping the transfer links between card and terminal with fraudulent intent will not reveal any data or give any clue for deciphering data.

(b) the money purse should contain only a singleLSI chip with the lowest possible number of bonding pads so as to ensure high yield, high reliability lowest cost and lowest power consumption.

(c) the design should permit repeated updating (reloading of value data) and debiting operations; the updating should be such that terminals for debiting operations cannot in any circumstances be modified for updating functions.

(d) It should be possible to add any amount to the value of a card up to a prescribed maximum card value at e.g. Post Offices, Supermarket Supervisor offices, and from one's own home telephone.

(e) debit operations (=electronic payments) should take no more than one second.

(f) a card, when lost, can be readily returned to owner (g) an "electronic moneypurse" or card cannot be utilized by a thief, not even a first time.

(h) any malfunction of equipment at a vending machine or at a terminal shall not affect or alter any of the card data (i) the cipher keys shall not be hardware-based but shall be capable of being altered very frequently so as to preserve equipment and card stock validity even if any temporary fraudulent intrusion were possible.

(k) "the money-purse" shall be robust enough for many years of continued use.

(l) the system must be such that the large majority of debit transactions (electronic cash payments) shall be carried out in an off-line mode while a large majority or all the value adding operations shall be in an on-line mode.

Commenting on item (a) it must be pointed out that there exist today several top-grade cipher systems but it would be, in the opinion of the authors, difficult to make required card hardware compatible with requirement (b). A cipher circuit will be described, therefore, which, it is believed, can achieved with relatively modest logic the same standard of imperviousness to crypto-analysis as more advanced systems such as the well-known data encryption standard (DES). However, in the preferred embodiment, the new circuit is not proposed to be a separate unit but is integrated with the value transaction processor on a single chip both in the "card" as also in the terminal. None of the clear data lines are accessible on the chip or outside with probes or the like. In other words, only ciphered data enter or leave the chip bonding pads. Concerning condition (c) it should be observed that a very high degree of encryption safety is needed to satisfy this condition but, at the same time, it should be obtained at only moderate cost over and above the cost of a pure debit chip. Two solutions will be presented; one embodiment (FIG. 4 and 7) is expected to be adequate for use by many organisations. The second embodiment (FIG. 4+9) version would be adequate for regional usage (i.e. a common electronic data carrier for the whole of Europe, or Nothern America, or Africa etc).

Further features and peculiarities will become evident from the description of the drawings FIG. 1–10 in which FIG. 1 shows the general data transfer relationship of the system between one or more "card readers", a local terminal, a central computer common to a multiplicity of terminals, and a card.

Figure 3:
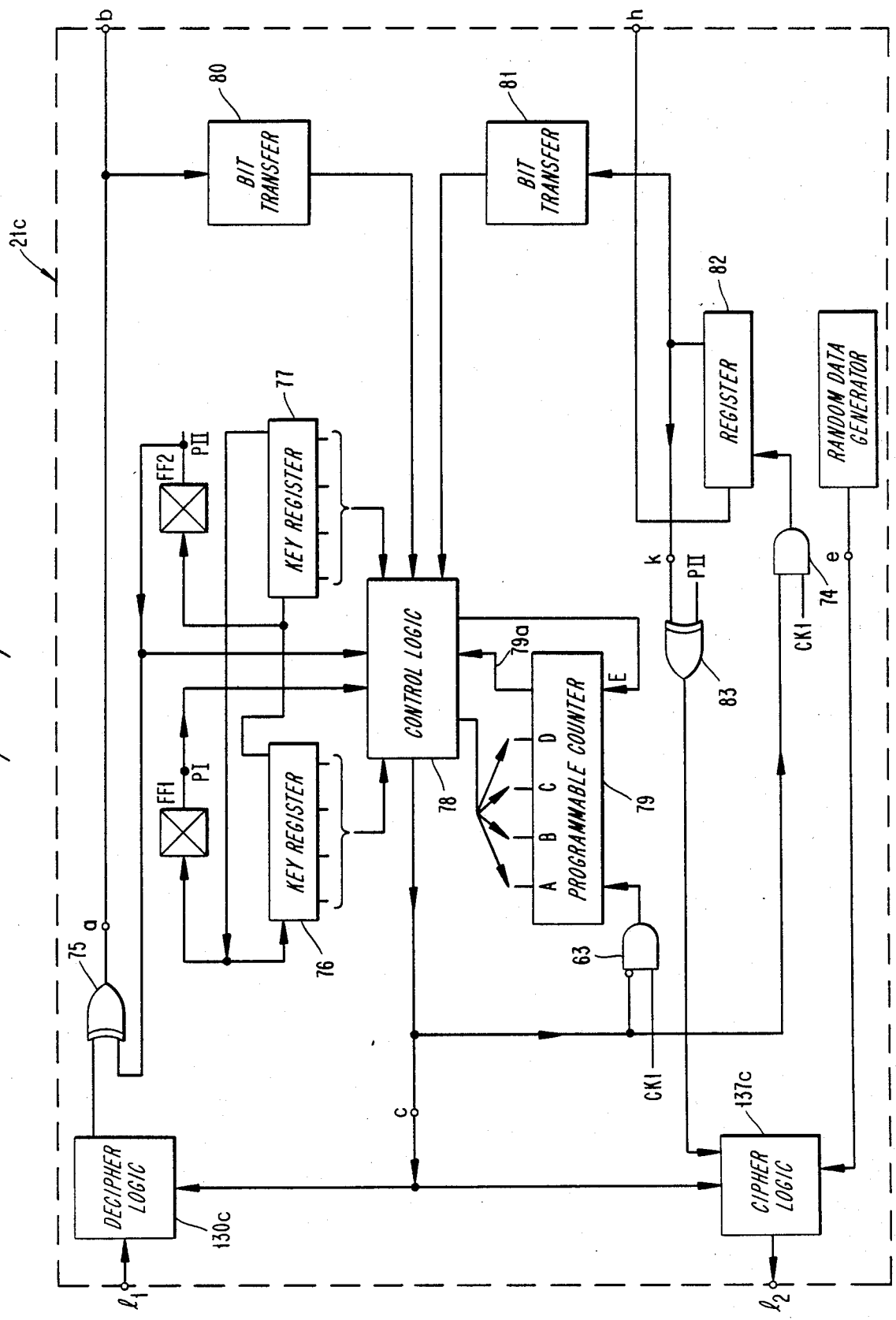
FIG. 3 shows a functional block diagram of the cipher sections 21c or 21t in FIG. 2.
Figure 4:
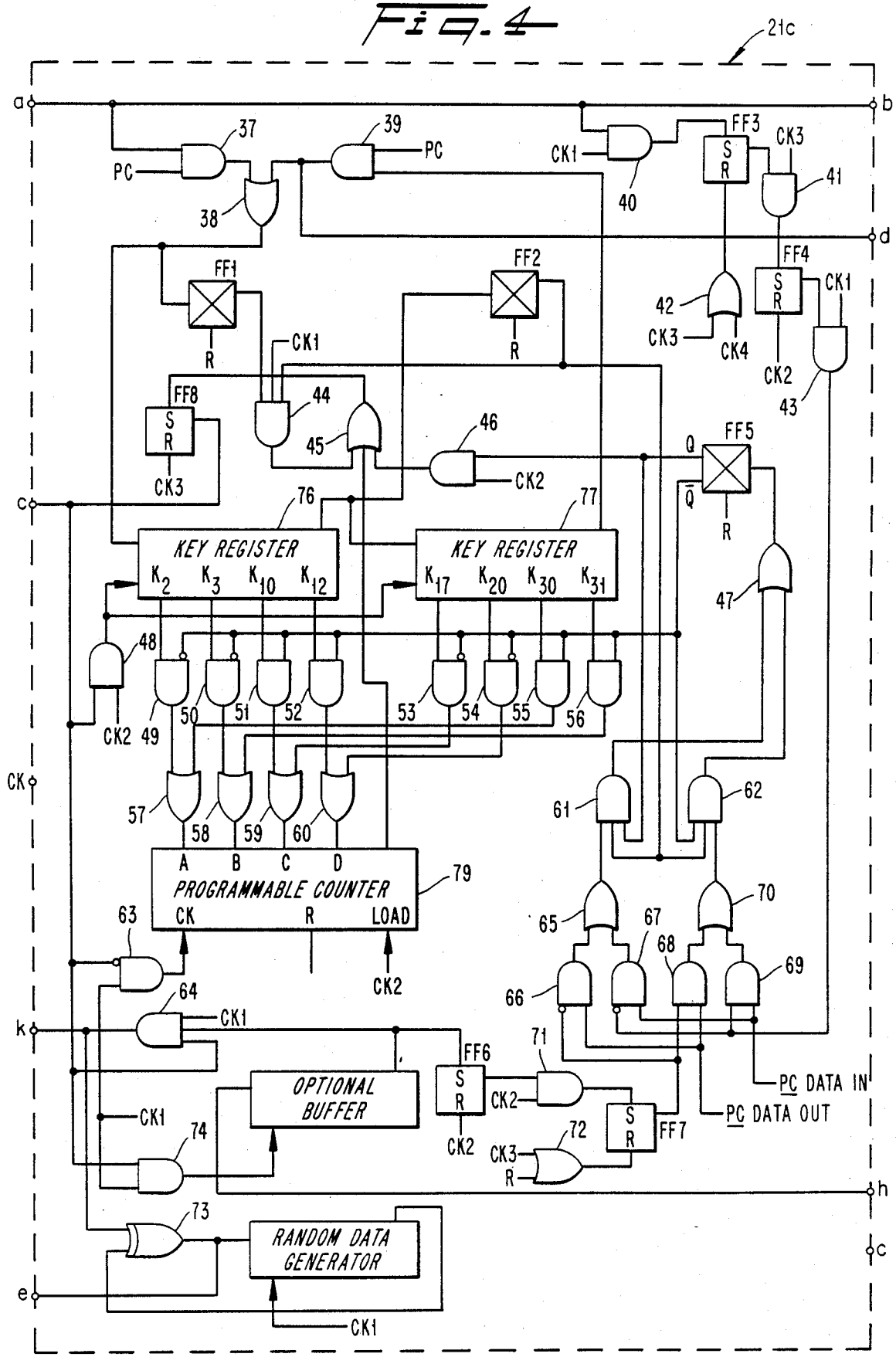

FIG. 4 gives, by way of example, a logic diagram of the cipher control generator circuit consistent with the block diagram of FIG. 3.

Figure 2:
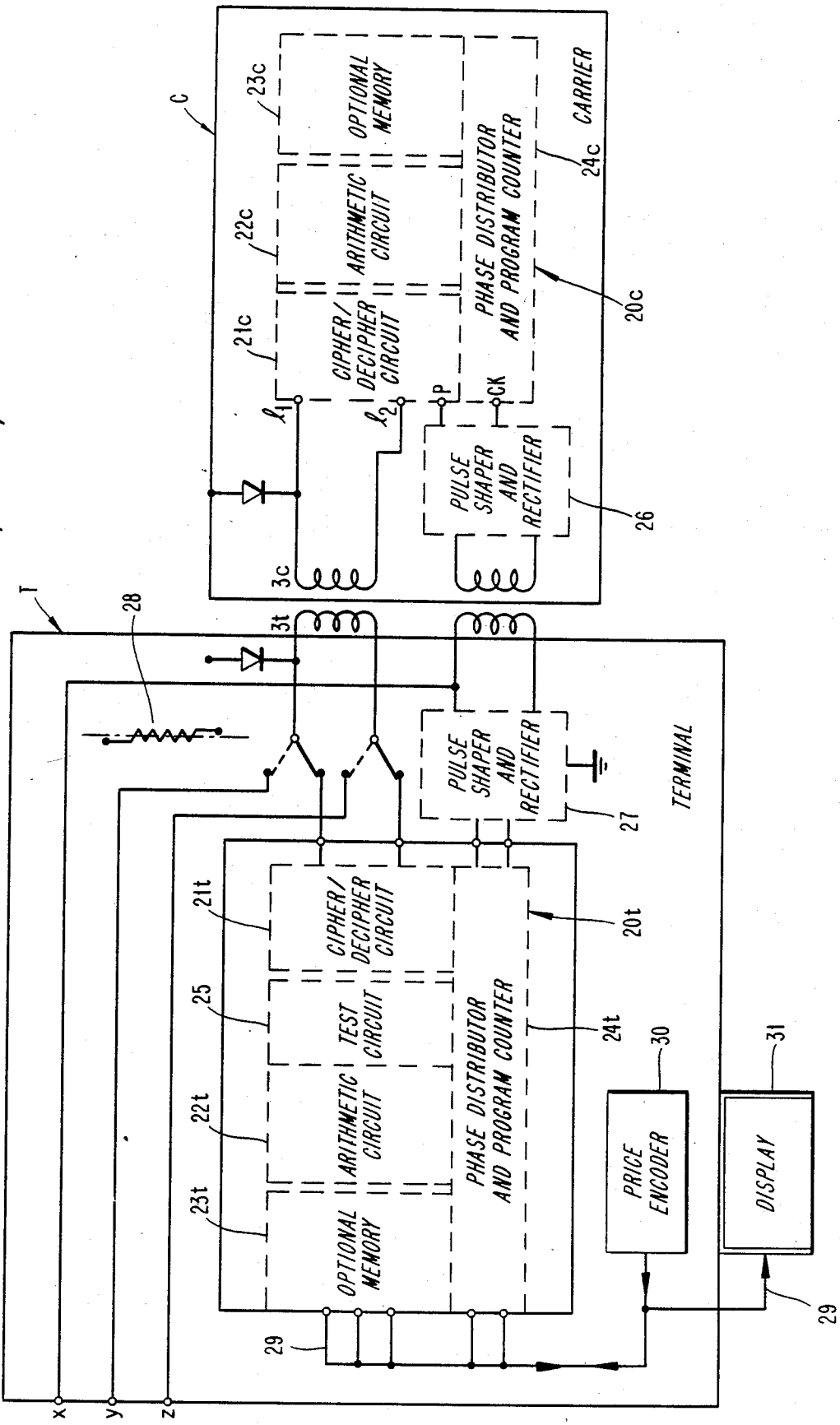
FIG. 2 shows in more detail the data transfer relationship between a card and a Terminal which incorporates also a "Reader" unit.
Figure 5:
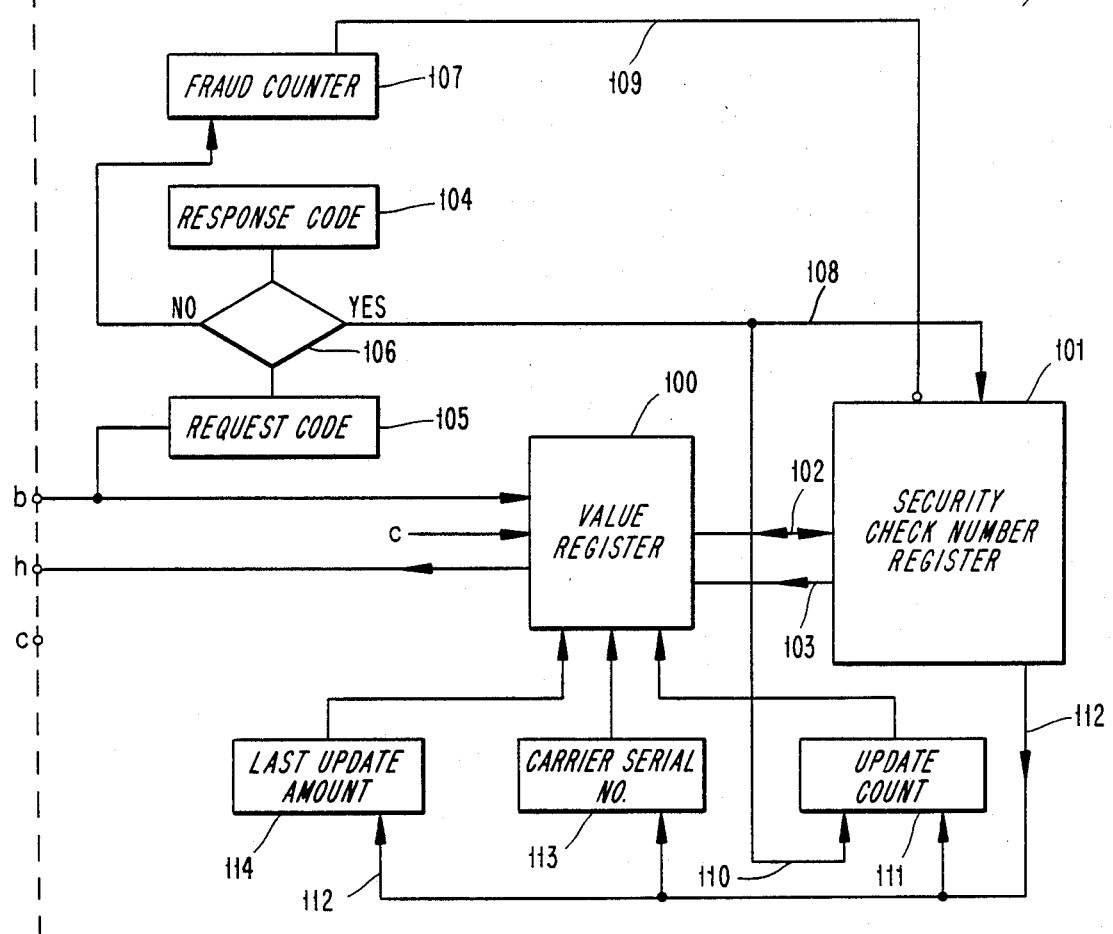
Figure 6:
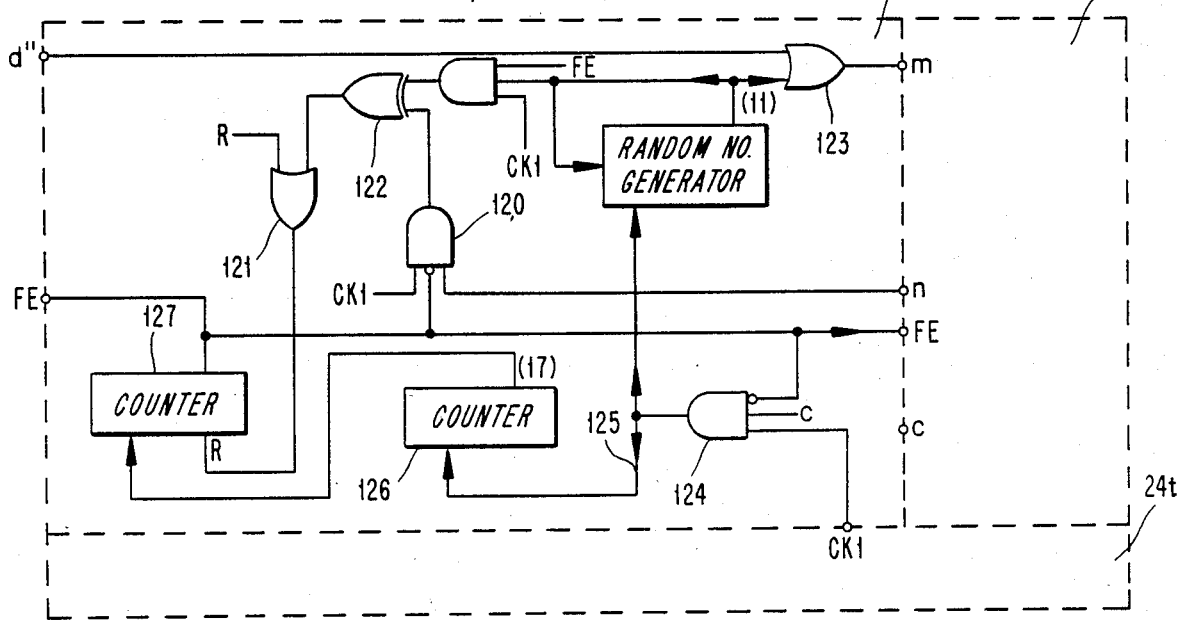

FIG. 5 is a functional block diagram of the chip section 22c or 22t in FIG. 2, mainly concerned with debit and credit operations FIG. 6 is a sketch relating to a circuit portion in the terminal for which there is no corresponding part in the card circuit; it relates to the preliminary testing of the card-terminal interface performance.

Figure 7:
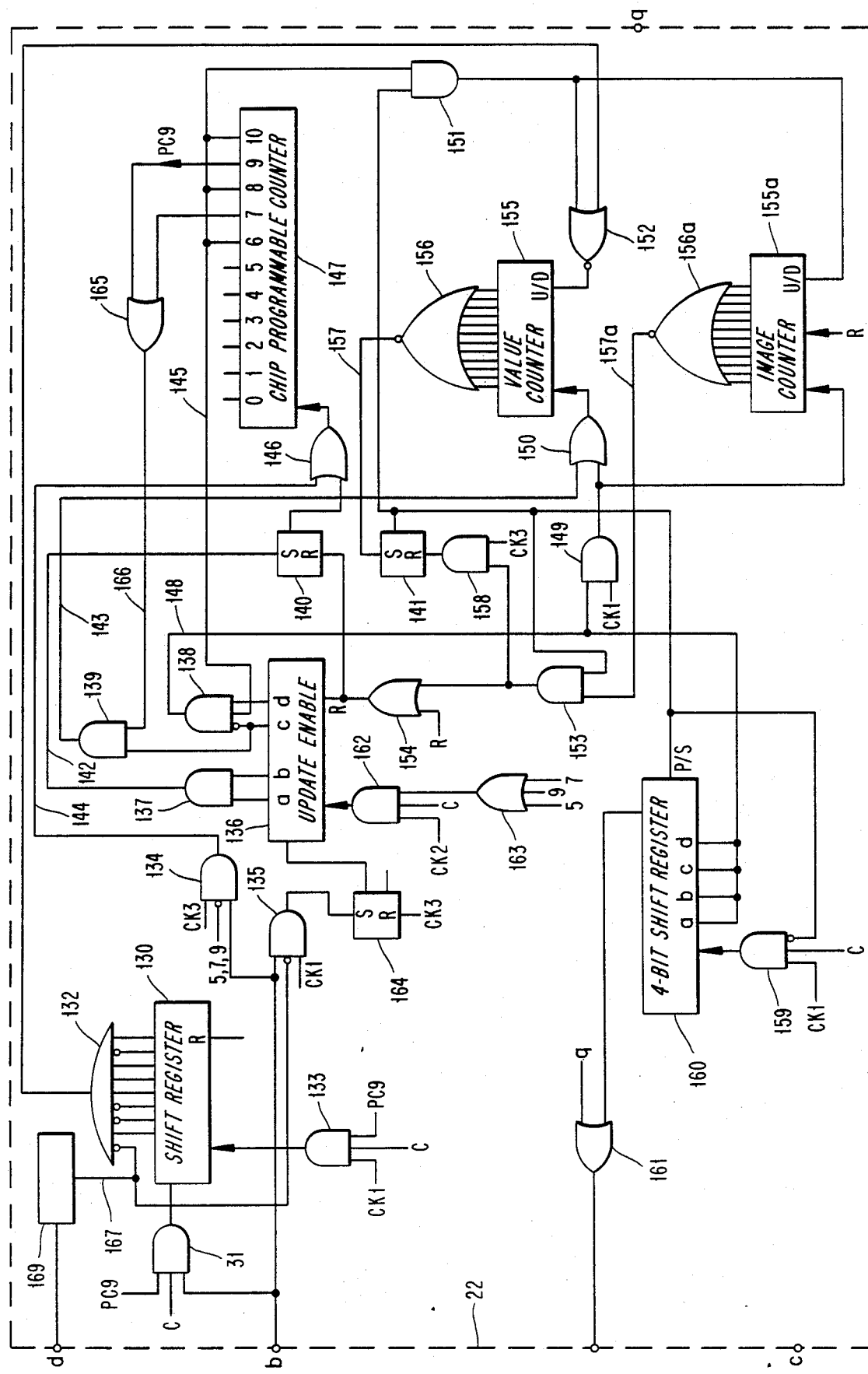

FIG. 7 gives an example for executing the block diagram of FIG. 5

Figure 8:
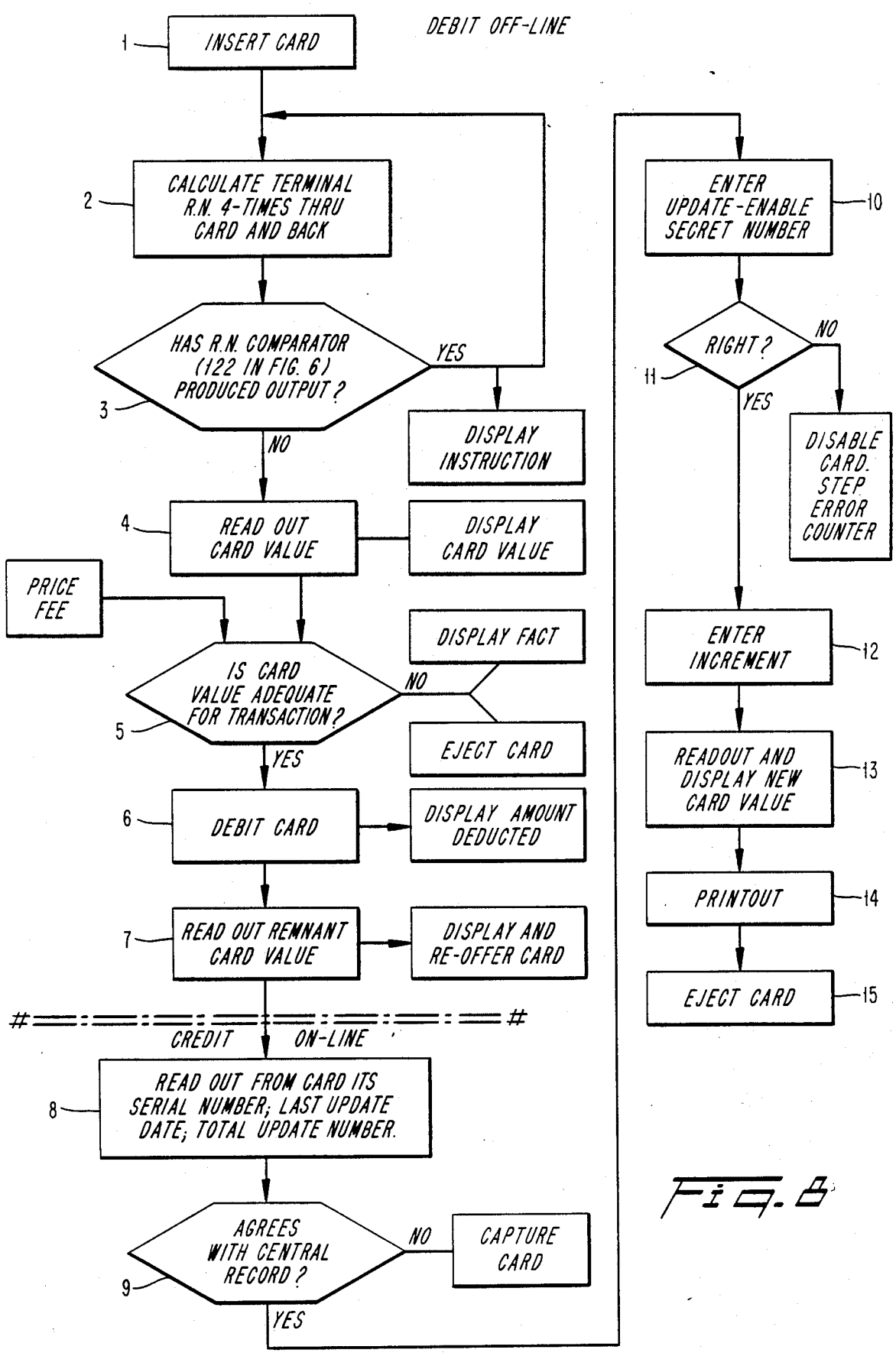

FIG. 8 is a flow diagram of the functional and decision steps for a card employing the circuit combination of FIGS. 4 and 7

Figure 9:
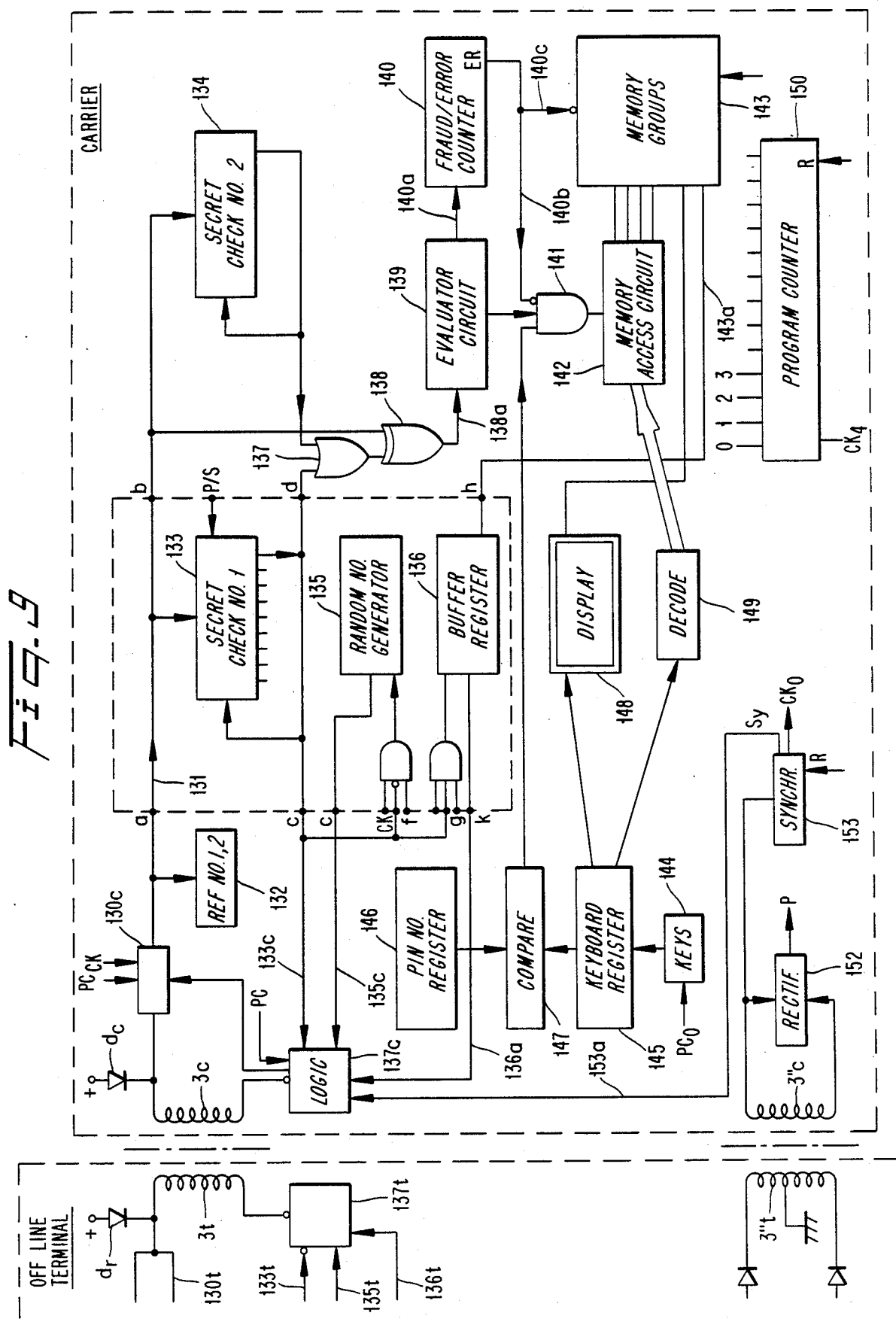

FIG. 9 shows a logic diagram of a more advanced card circuit wherein the card is also equipped with push buttons, foremost for the purpose of entering a Pin number (personal identifying number of the owner).

Figure 10:
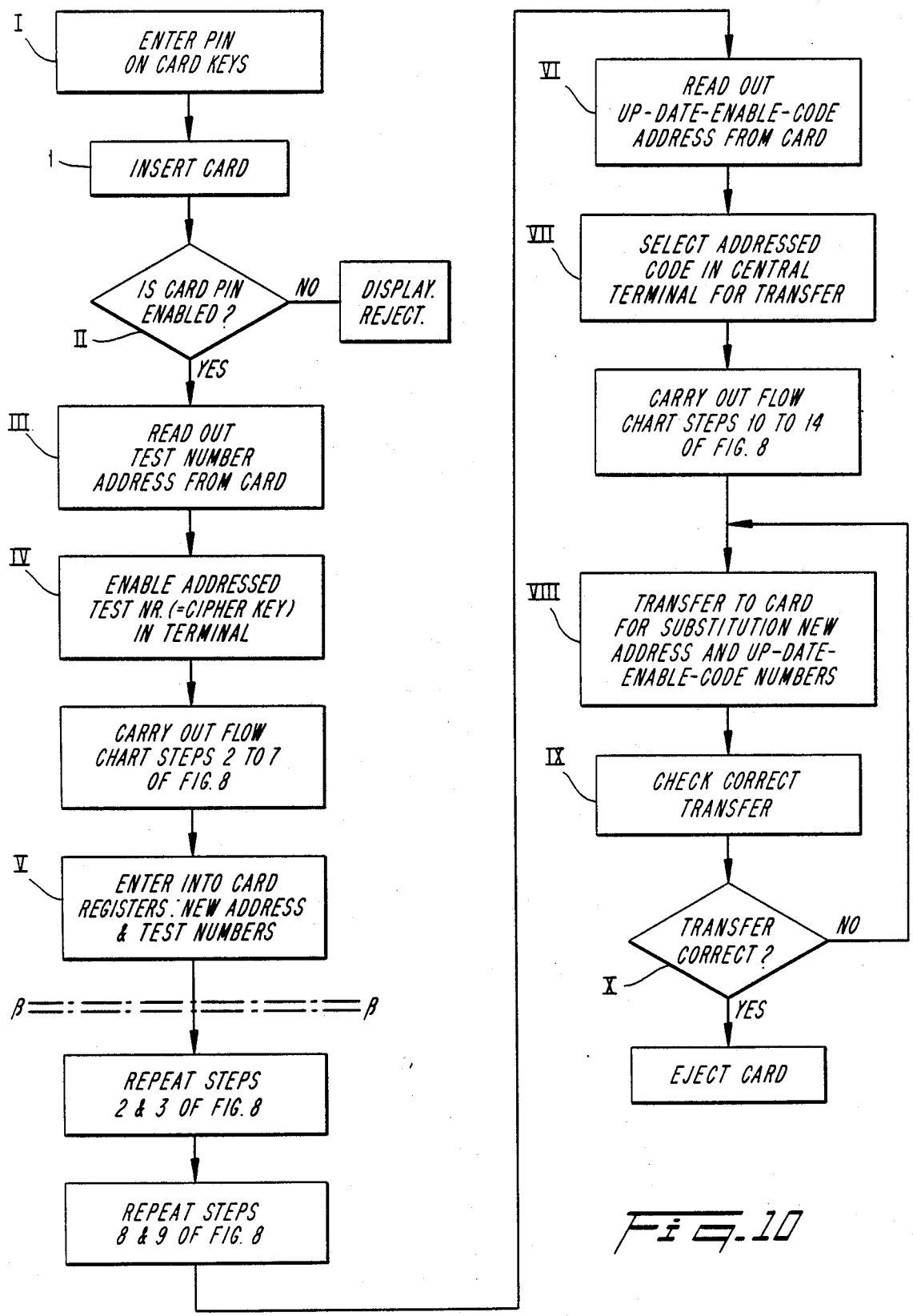

FIG. 10 is a flow diagram of the functional and decision steps for a card using circuit combination of FIGS. 4 and 9.

Figure 11:
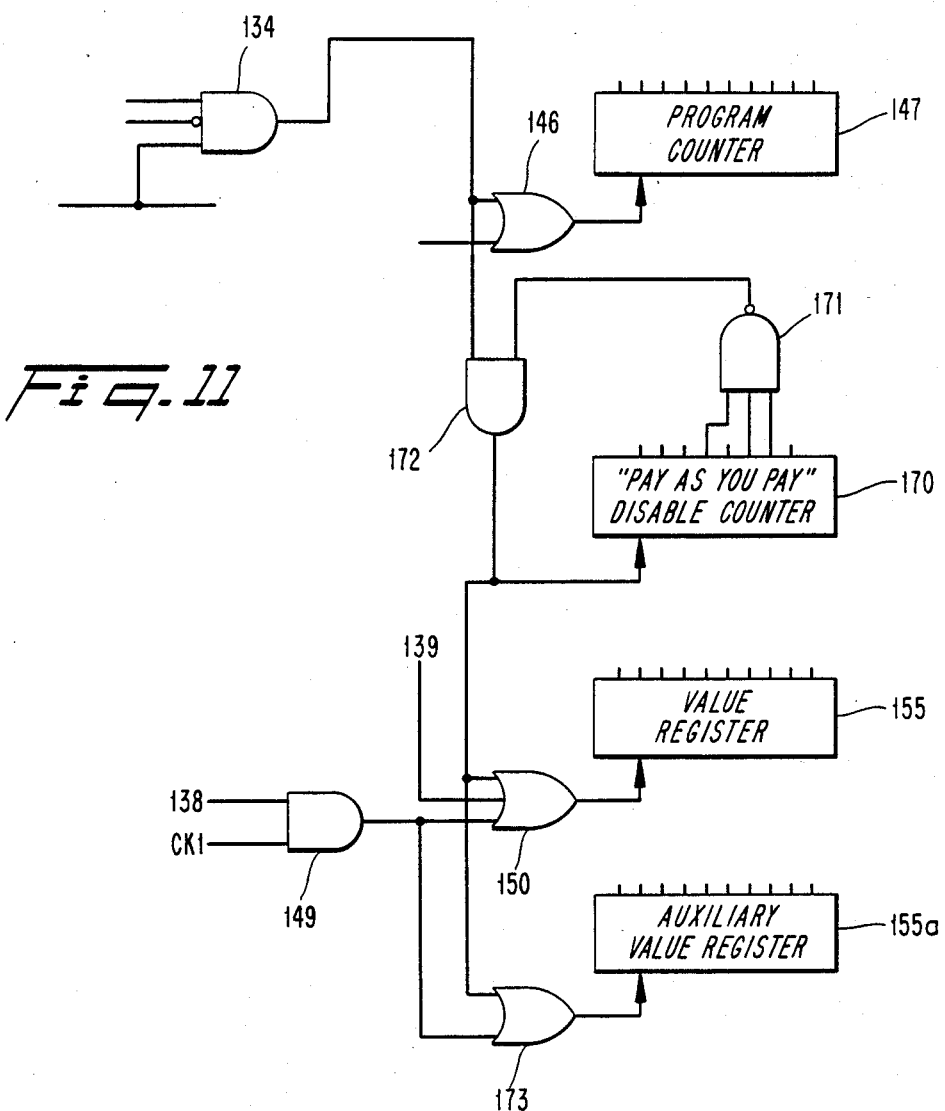

FIG. 11 shows a portion of the circuit shown in FIG. 7.

Figure 12A:
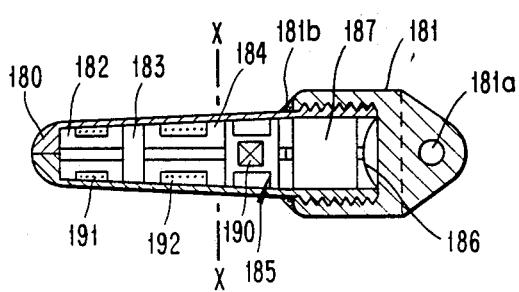
Figure 12B:
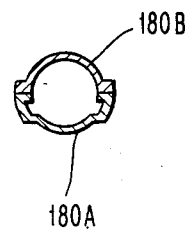

FIG. 12 shows a physical embodiment of the money purse in accordance with the present invention.

Figure 1:
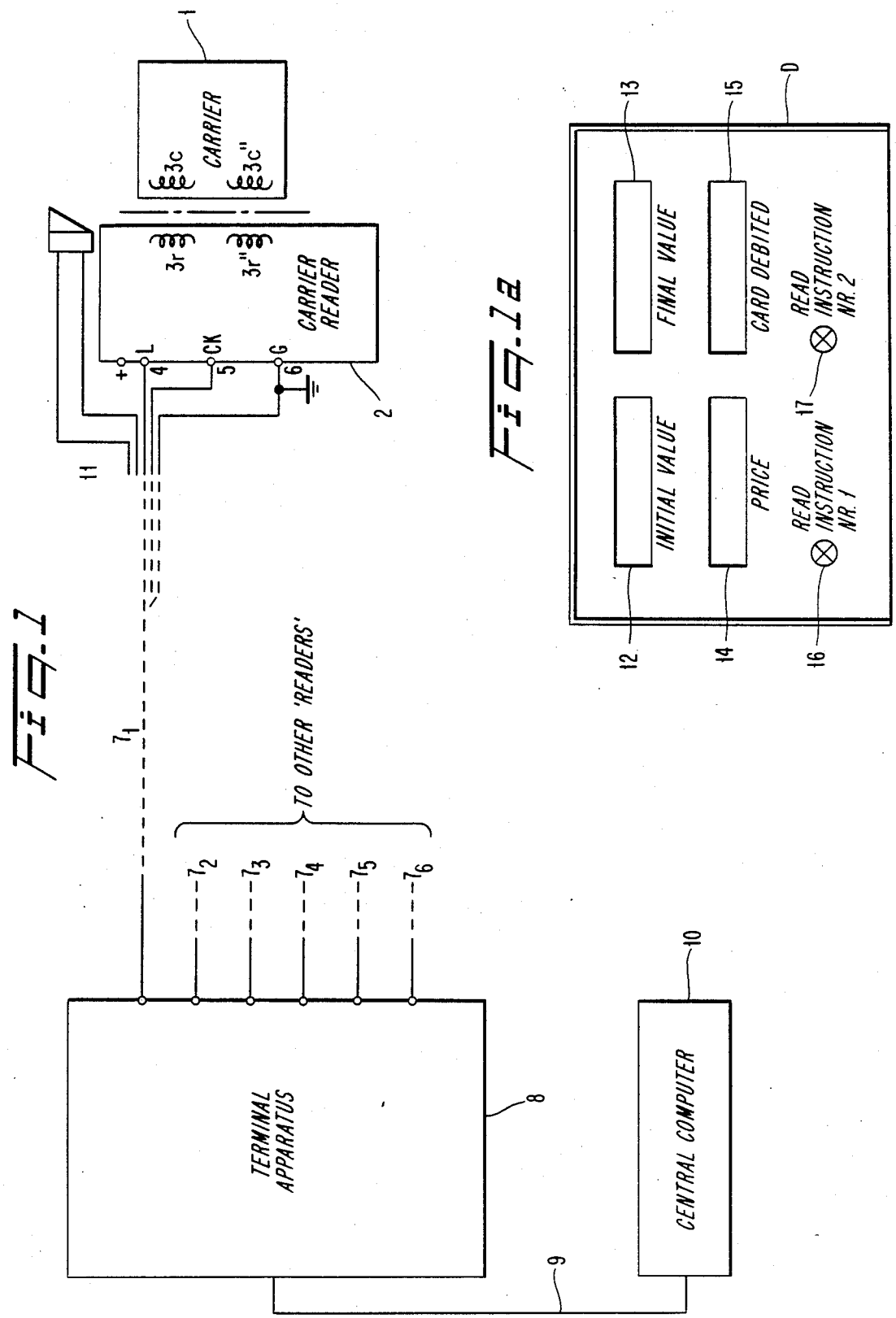
FIG. 1a shows details of the displayed information on display window of FIG. 1.

In FIG. 1, "C" is a data carrier token or "card" 1, "R" is a token reader device 2 which, it is noted, has no moving parts, "T" is a terminal apparatus from which go out several cables, $7_1$ to $7_6$ leading to six similar readers "R" which may be operated quasi-simultaneously by the so-called time sharing method. There is also a communication line 9 connecting a central computer 10, say a bank computer, with a multiplicity of "terminals". In the system here to be described the intention is to allow the majority of all *card debiting* operations to be executed by virtue of the built-in security measures of a terminal (8) alone. Nevertheless, the central computer 10 retains vital functions as follows:

(a) in the nightly collection of summary cash data from terminals 8

(b) it is directly involved in all up-dating (value incrementing) operations where a value is *added* to the card by *on-line data transfer.*

(c) as a means for auditing the effectiveness of the security measures relating to debit transactions; the provision shown in FIG. 2 is introduced making a debiting terminal responsive to a command signal from the central computer.

(d) replacement of the so-called "semi-active secret check numbers" (see patent application U.S. Pat. No. 184,377 now Pat. No. 4,499,556). According to the present embodiment, these check numbers are also used for cipher control. This is further explained in conjunction with FIGS. 9 and 10.

FIG. 2 depicts a preferred embodiment by breaking down the single card chip 20c in the card C into functional blocks, with 21c being the cipher/decipher circuit, 22c being the arithmetic circuit, 23c being an optional form of storing long-term accessory data, and 24c comprising the clock phase distributor circuit and program counter, etc. To repeat, all these part circuits, especially the first three, are embodied on a single semicunductor chip The block 26 covers pulse shapers and d.c. rectifier circuits. These supply power, and a four phase clock respectively to the main chip. The chip inputs $l_1$ and $l_2$ carry input and output encrypted data respectively. In the terminal apparatus "T" with which the card is coupled via card coils 3c and terminal coils 3t, a very similar chip 20t is placed having sections 21t, 22t, 23t, and 24t. An additional section 25 is provided the function of which is explained in connection with FIG. 6. Block 30 symbolizes a price encoder circuit which may be set permanently (for example within a vending machine) or as required by means of a manual key board (at a cash register). 31 is a display device to show up the initial and final transaction phases. See also FIG. 1a. If desired a small thermal printout machine may give the user a paper receipt. An important element in the system philosophy is the relay 28 which can be operated from a central computer 10 to switch transmission line 9 (FIG. 1). Line 9 is here represented by lines x,y,z and they replace the interface connections to the local terminal T in order centrally to spot-check the conditions of various tokens. The central terminal, in addition to performing the normal debiting operations of a local terminal, is capable of fetching from the card certain additional data derived from registers 111, 113 and 114 shown in FIG. 5. These registers hold the following data: Serial number of card, total number of updating transactions performed since the card was bought, and date and amount of the last updating operation. These data are then compared with the central record at the Computer 10. If they do not agree the central Computer instructs the local terminal to capture the card and to produce an informative display. Alternatively, the central computer emits a code for entry into the card which disables certain portions of the card making it unsuitable for further updating or further use. It suffices if only a small portion of all debit transactions is audited in this manner to discourage thereby any thought of fraudulent attempts against the system even if that were practically feasible.

The data encryption principles are now described with reference to basic block diagram FIG. 3. The block 130c is a logic circuit which causes binary data inputs received at $l_1$ to be passed on to the exclusive OR gate 75 in nearly deciphered form. After passing that gate the data at "a" are fully deciphered. Block 130c is controlled by line "c" derived from a larger logic block 78. The same control output "c" is also applied to logic block 137c which via another exclusive OR, 74, receives clear data from point K and passes them on in ciphered form at card point $l_2$. The circuit has shift registers 76 and 77 (marked SH1 and SH2) and could equally well have more than two portions. Each shift register portion contains part of a secret check number, also referred to as key. A fresh key is entered regularly at the end of a debiting operation (see also U.S. Pat. No. 184,377). Provision must be made in the circuit design for starting up a card by providing an access path for loading the register with a known factory number for the initial startup cycle. This said access path is then burned up while an unknown new check number is entered for immediate replacement. Thereafter, check numbers remain unknown and undetectable by virtue of the cipher processes to be described. Each of the shift register portions SH1 and SH2 has a parity counter, FF1 and FF2 respectively with parity outputs PI and PII.

A programmable counter 79 contributes to the combinatory logic circuit 78 from which the control line "c" is derived. This counter is stepped by clock phase CK1 whenever the output at "C" is at logic level zero. The counter keeps being stepped until a predetermined bit output or the "Carry" output of the counter is reached which feeds into the control logic 78 via output line 79a. A further contribution to the control logic is procured by the data bits contained in data being received or data being read out from the card. This is done via one-step delay circuits 80 and 81 respectively. As an alternative, not shown in FIG. 3, the data entered into the data buffer register 82, may operate another flip flop for parity count and when the buffer is full, the parity output is applied. The logic block 137c admits data bits from exlusive OR 83 altered in dependence of parity output P I or P II and passes them on to terminal $l_2$ whenever line "c" is high, and when the same goes low admits only random data from the random data generator R M G.

The role of the programmable counter circuit block 79 is to introduce added random data over and above those which would appear if the cipher key number in registers 76 and 77 alone were the controlling factor. For this reason this circuit element may also be called *"data bit spacer generator"*. Its action must of course be repeated in a similar circuit block within the terminal otherwise it would be impossible to decipher the data passed in either direction. The programmable counter spacer generator is controlled by a number of bits derived from the key register but modified by data bits already transferred. Dependent on the logic in block 78, different expansion ratios may be procured; that is ratios between the number of data bits transmitted to the data bits contained in the useful data. It is not possible to determine where useful data in the data string begin and where they end. Nor is it possible to identify any particular bit or groups of bits as belonging to a certain group of data.

The circuit of FIG. 4 provides an example for how the just decribed principles may be put into practice. The diagram is confined to the portion which has the boundary points "a", "k", "e" and "c" on the left, and "b", "h" and "c" on the right (bordering on section 22c of FIG. 2). The data input "a" corresponds to the data input terminal $D_{IN}$ in FIG. 1A of current patent application GB No. 2057,740 and the shift registers SH1 and SH2 correspond broadly to shift register S2 in the cited figure. As in the cited patent application, the contents of these registers are not fixed but may be changed and rotated with others after each transaction, as well as completely changed over periods of weeks. This structure is again used because of the Applicants' opinion that a frequently alterable security key can provide greater security against unforeseen intrusion than a fixed key. As already explained in the present application, these keys also serve as encryption keys. In theory, it would be possible to make the key length so great that a computer would take many years to scan through all the possible number combinations. However, in a card context, such as herein described, it is preferable to use much shorter key lengths and rather to scramble them with or dilute them in random numbers.

The effect of the programmable counter or data bit spacer generator is that the effective key length is increased. That means that the scanning of key combinations applied to known clear data and known (recorded) ciphered data would take much longer than would normally correspond to the scanning of key combinations alone. Assume that the scanning time is six months and the period for key change-over only four weeks. Clearly, there would be no point in continuing the search beyond the first four weeks, and since the chance of finding the key number in four weeks is poor, there would be no point in commencing the effort at all.

CONCISE DESCRIPTION OF FIG. 4

The cipher key is entered serially via point "a" and gate 37 during a program step PC, and via OR gate 38 to the input of shift register SH1. The flip flop FF1, starting from a reset condition, is set and reset dependent on changes of '0's and '1's and its instant state therefore represents the parity for the data bits entered. This is repeated for the other half of the register (SR2) by means of flip flop FF2. "c" is the control output which encrypts or decrypts data. 'c' is high when the bistable FF8 has a high q-output. The bistable FF8 is set at S in three different ways (in this particular example):

($\alpha$) If both FF1 and FF2 happen to have a high output simultaneously ($\beta$) if FF2 has a high output combined with a high or low incoming or out going data bit dependent on the previous state of the flip flop FF5.

($\gamma$) if the counter 79 is full at its output $Q^N$ having been clocked up during 'c'=0 periods via AND gate 63. The number of count pulses, however, for reaching this output is dependent on the programming input levels at A, B, C, and D which derive from parallel bit out puts $K_2$ $K_3$ $K_{10}$ and $K_{12}$ of register SH1 and alternatively from parallel bit outputs $K_{17}$, $K_{20}$, $K_{30}$ and $K_{31}$ of register SH2. Whether the first or second set of program inputs is applied depends on the Q output state of the flip flop bistable FF5.

It will be noted that these programming inputs change frequently on account of the fact that the clock input to the said key registers is enabled whenever "c" is high and the AND gate 49 receives a clock spike in time phase CK2. The program inputs to the counter do not change while the counter is being stepped, that is when "c" is at logic zero but is likely to be quite different when "c" becomes zero next time. The state of the bistable flip flop FF5 depends on the combined history of key bits and data bits. (as can readily be seen from the circuit diagram). This circumstance forces the analyser, when trying to achieve results by computerized trial and error scanning, to go through all the possible combinations of key bits and data bits (This assumes further that the analyst has full knowledge of the cipher circuit for simulating it in a computer). Even though the clear data bits may be known, what remains unknown is the position of the ciphered data bits within the substrate of random bits since the counter 79 introduces quasi-random spacings which again depend on the unknown recirculating key bits. From this comes the uncertainty about where the first data bit begins and the last one ends. The scanning process must therefore cover the entire data string of random plus data bits.

The periodic changing of key numbers is a contributive element to security. Such changes would be initiated from a single area or regionwide center, mainly during nightly hours via telephone lines when based on a protocol similar to that described for the card-terminal transfer cycle. The regional center transmits a new valid key number in encrypted form to a national or local center or bank headquarter in replacement of another key number in the category of "semi-active" numbers. From there, similar replacements would take place to all locations, where money transfer terminals are in operation. The capability of hierarchically passing down new cipher keys in ciphered form on a continual routine basis at irregular intervals has the consequence of simplifying the card chip and increasing the security against encryption intrusion of the money transfer system. The cost of this hierarchic system is extremely low and contributes to a robust, low cost electronic card design.

An example for the arithmetic portion of the card chip is given in FIG. 5 (block diagram) and FIG. 7 (partial logic diagram). In FIG. 5, 100 is the arithmetic register containing the memorized values of the card. 101 contains security numbers for comparison and the program counter and associated logic processors. These blocks may also be replaced by a microprocessor. In the simplified version of FIG. 7, the block 111 of FIG. 5 represents a counter register which carries a record of the sum of past updating operations (value-add operations) carried out with the card since its acquisition. 113 is a register containing the unique serial number of the card, and register 114 contains the value by which the card was incremented during the last updating. The readout of these data is initiated by a code word transmitted by a central computer station concerned to the card and entered therein in register 105 whereupon comparison takes place in circuit group 106 with the contents of register 104. If there is equality, block 104 produces an enabling output on line 108 whereby the said counter 111 is incremented by 1. Thereafter the block 101 causes the consecutive serial readout of the cited three figures which are transmitted to the central computer installation in ciphered form. If the update-enable code entered into register 105 is wrong, the fraud counter 107 is stepped up by one; after a few of such unsuccessful update attempts had been made the said counter reaches output line 109 which finally disables the entire update mechanism of the card.

FIG. 7 shows the detailed example for this circuit. Block 147 is the chip program counter, 155 and 155a are a value counter and respectively an image counter of identical build-up. Block 130 is a shift register for receiving an up-date enable code, block 136 is a four bit shift register with paralell bit outputs, block 160 is a four-bit shift register with parallel bit-inputs. It is assumed that the counter prior to a debit operation is in position 5 and position 6 must be reached to obtain a debit function. According to the present embodiment, the terminal emits a bit sequence equal to 1 0 1 1 which reaches the chip portion shown in FIG. 7 at point "b" and is entered via strobing gate 135 and bistable 164 into the shift register input of register 136. When the entire code is within the register the gates 137 and 138 produce outputs with the consequence that gate 162 is disabled (because a stepping pulse is applied to program counter 147 via or gate 146) and output line 148 therefore remains high enabling gate 149 which now produces a rapid succession of stepping pulses into counters 155, and 155a. The difference between these two counters is, however, that 155 will, as a rule, be loaded with a value number, whereas counter 155a is always reset at the commencement of a transaction. A further difference is that the up/down mode input for 155 is initially high whereas for 155a it is low. Therefore, counter 155 will count down whereas counter 155a will count up. When counter 155 reaches zero the NOR gate 156 produces a high-going pulse along line 157 to set the bistable 141. 'At this moment bistable 141 is set to produce a high output "Q" enabling gate 151 which causes the output from NOR gate 152 to go low thereby putting the counter 155 into count-up mode. At the same time, counter 155a is put into a count-down mode, and when the same reaches zero the value count in counter 155 has just been restored. At this moment, the NOR gate 156 goes high, enables the gate 153, and produces not only a reset pulse to the bistable 141 but also to the shift register 136 and the bistable 140 so that clock pulses to the named counter 155 and 155a stop. Also, the parallel mode input to shift register 160 returns to serial mode so that the inserted binary numbers are now serially transmitted via OR gate 161 to terminal h for encryption and transfer to the Terminal where it is decoded and recognized to stop the value counter. The resulting count minus 4 represents the double value count for the card. This is displayed on window 12 of FIG. 1a. This is compared with the price set for the goods or services required and the debit cycle is not commenced if the card value is insufficient. If it is sufficient, the terminal emits a pulse synchronous with clock pulse phase CK3 which (by-passing the cipher sections) reaches AND gate 134 and causes the Program Counter 147 to be stepped from output 6 to output 7. This enables AND gate 139. After that the Terminal T emits a code 01010101 etc. which is passed through the cipher/decipher sections and reaches gate 135 and register 136.

Every time the high level bit passes output "c" in register 136 AND gate 139 produces a pulse which is inputted to the value counter 155 via OR gate 150 thereby debiting the register with as many basic value units (for example cents) as debit pulses are transmitted by the terminal. After the debit operation is completed the terminal T emits again a pulse in phase with CK3 causing the program counter in the 'card' to advance to position 8. Thereafter the value readout cycle already described is repeated and the result is displayed in the terminal on display window 13 (FIG. 1a). The amount debited on the window below is also displayed which reflects the actual debit pulses transmitted as explained. A printout device receives the information from the same sources.

THE ADDING-VALUE CYCLE (updating procedure).

For this operation there is no circuitry provided in a debit station. The card holder must go to an authorized mediator point such as post office, bank or licenced supermarket checkout point. Alternatively the operation may be done from one's own home phone. Updating circuitry is contained only in certain central computer banks serving certain regional areas. During a first phase of the add-value transaction the computer goes through the same program steps 0–8 which are required for the already described debit transaction without necessarily decrimenting the card. The actual crediting process begins with entry (in ciphered form) of a "secret update number" into the register 130 after first stepping program counter to position 9. This "secret number" is in the case of FIG. 7 a fixed number but, as will be shown in FIG. 9, it may be a substitutable number as well. Conditional on the aceptance of this number is also that the comparator 169 responsive to a comparison of the first check number or cipher key does not produce an inhibit signal on line 167. If detection in Gate 132 is in order it produces a high output applied to NOR gate 152 thereby enabling counter 155 to count upwards. Next the central computer produces count pulses 010101010 etc. as already described which pass through the shift register 136 and the gate 139 to the counter 155. As many 'one' pulses pass to this counter as many basic value elements are added to the card. Finally, the central computer transmits the code which causes the card to read out the new value status, namely 1011 (read from left to right). This process has already been described in connection with the debit operation and need not be repeated here except to state that program counter goes to position 10 and the two counters 155 and 155a go through their readout performance. Further program positions might be provided if found necessary for corrective messages from the computer to the card. Such details are not shown here. Input q to OR gate 161 is intended to connect to chip section 23c where for example the memory arrays holding the card's serial number, number of update transactions, and latest value add operation details may be held. As already explained, these details are also transmitted at the very beginning of the updating phase, and if these data do not agree with the centrally held record the computer may utilize means provided for sending out a special "Hold Card" signal to the remote update terminal which may cause the card to be captured or, dependent on the nature of the terminal may take other measures to prevent the holder from using the card again unless first presented to an inspection office. (see discussion of FIG. 5).

An important aspect of dependability of the system is to ensure that a fault-free linkup is established between a terminal and a card b e f o r e any actual transfer of transaction data begins. To this end a small portion of the chip (section 25 in FIG. 2) is devoted to carrying out a pretesting function. This is explained by means of FIG. 6. The "linkup" between a terminal and a card can be considered well prepared if a signal-any digital signal-emitted by the terminal, passed through the cipher process, crossing the interface, deciphered in the card, re-enciphered in the card, crossing the interface once more, de-ciphered in the terminal, compared with the original signal and this sequence repeated four times without interruption produces every time the correct replica of the original clear signal. Referring to FIG. 6, R N G is a random number generator producing a signal having, say, 16 bits.

Block 127 is a two-bit counter with an output after four count steps at FE. Block 126 is a counter counting the number of clock pulses needed to pass a data bit through the random register RNG. Random data are passed at 'm' to the encryption section 21t (FIG. 2), then transmitted to the decipher section 21c of the card and then recirculated four times. The data return to the FIG. 6 circuit at point 'n' and then compared in exclusive Or gate 122. If there is a deviation Or gate 121 passes a reset pulse to terminal R of the twobit counter 127. In this way, a terminal will only start a transaction if an uninterrupted "correct" comparison is achieved in four transmission cycles. F E is thus a "function enable" line which must go high before a debit cycle can begin.

Next a more developed form of card shall be described but to illustrate the difference between a simple "money card" and the more elaborate "money purse" represented in FIG. 9, it may be useful to go through the two flow diagrams for the two versions shown in FIGS. 8 and 10 respectively.

The functional steps are written into the blocks of the flow diagram and are therefore self-explanatory. Each step is marked with an Arabic index number. In FIG. 10, the identical steps are marked with identical Arabic numbers whereas the added new steps are marked by consecutive roman figures. In this way the added security precautions can easily be recognized. A card capable of performing the flow diagram FIG. 10 is equipped with data entry keys. They are primarily used to enter the owner's personal identifying number (PIN) into a PIN register in the card (Step 'I'). ('III') is a step that must come before step '2') in the FIG. 8 diagram because - as described in greater detail in U.S. Pat. No. 184,377, now Pat. No. 4,499,556 - the terminal must first select the cipher key, based on a reference number supplied by the card, from a battery of eight key numbers valid at the time. This reference or 'address' as provided by the card in unencrypted form (synchronous with CK2 or CK3). Only after step IV can a ciphered transmission take place since the key number must be the same in terminal and card. In step (2) the effectiveness of the cipher/decipher action is tested (see FIG. 6).

The steps (2) to (7) in FIG. 10 are identical to those described and represented in FIG. 8. Step (V) on the other hand again reflects the greater mobility of the key numbers used since, at this point of the flow diagram, the card receives a new key number and a new address for that key number.

In FIG. 8 the dividing line between transactions that can be performed in a debiting terminal and those that can only be performed on-line in communication with a central data bank, is marked #—#. A similar dividing line marked β—β exists in FIG. 10. The steps 8 & 9 will of course reveal the congruence of card data with centrally kept data as already explained (serial number, sum of update operations, and last update particulars). Steps VI and VII signify that also the "update Enable" check or key number is in the second version of the card not fixed (as in the example of FIG. 7 and flow diagram 8), but is made alterable along the same principles as explained in U.S. Pat. No. 184,377, now Pat. No. 4,499,556. Thereafter follow the steps (10) to (14) already found in FIG. 8 for the execution of crediting operations (value-add). Finally, in step VIII the secret up-date enable numbers and the associated address number are substituted by other pairs. In steps IX and X the correctness of this substitution process is checked, and if required the proceedure is repeated.

A study of the flow diagram of FIG. 10 will facilitate an appreciation of the various elements in the logic diagram of the more advanced 'card' as shown in FIG. 9.

As in the simpler form, the inductive transfer links connect directly to the cipher/decipher circuits via terminals 3c, 3t, 3"c and 3"t respectively. The cipher action is performed by elements 130c and 130t respectively; and 137c and 137t respectively. A not necessarily integrated circuit for current supply (152) and a clock pulse generator 153 are provided in the card. The cipher control circuit in the card is enframed and marked FIG. 3 or 4; inside this frame only a few basic ciruit groups are indicated (such as key register 133, data buffer register 136, and random number generator 135). The key here referred to as "secret check number 1", is paired by another block marked "secret check number No. 2". The same is identical with the so-called "secret update enable code" of FIG. 10.

The serial comparison of the No. 1 and No. 2 secret check numbers occurs via OR gate 137 and Exclusive OR gate 138 and is evaluated by evaluator circuit 139. Unsatisfactory comparisons step up the "fraud counter" 140 which after a preset number of defective tests disables the card and optionally produces a display on the window 148 of the card.

The organisation of the memorized data may of course differ from the form shown in FIG. 7. Block 143 may be an electrically alterable ROM circuit or form part of a microprocessor The diagram also illustrates the presence of manually operable keys 144 on the card. These act on an internal card register 145, a humanly readable display 148, and via an encoder circuit 149 on a memory selection circuit 142. A prime purpose of the keys is to ensure that only the legitimate holder of the 'card' can use it. This is done by a comparison step carried out by means of a Pin register 146 and a comparator circuit 147 whose output is one of the enabling inputs into AND gate 141.

Finally, some explanation shall be given about the potential significance of an electronic money purse which may hold a variety of data, for example in section 23c of the card chip shown in FIG. 2. This section contains data memory arrays which are accessed conditionally or unconditionally dependent on their nature. One particular aspect can have outstanding significance for the future application of electronic retail consumer purchases. It may become a tool for the fight against inflation and for existing long-term policies for the conservation of energy and, in times of emergency, the temporary rationing of goods in short supply. This significance is given by the possibility of recording in the card the quantity purchased of a definite item over a span of time. As an example may be cited medical or other drugs. If certain drugs could be purchased only with electronic money it would be possible for a drugstore to refuse a customer when it is known that a drug which is harmful when taken in quantities has already been purchased in other stores in excess of a permitted level.

The "electronic money purse" itself would furnish the intelligence to the drugstore cash register terminal which then would automatically refuse payment from the "purse" unless an override signal (say by the chief drug chemist of the store turning a special key) is released in the terminal. As an alternative to refusal the price chargable may increase with the quantity obtained over a defined past period. Such price increases, for goods in short supply for example, may be legally prescribed and pre-programmed into the arithmetics of the cash register or card terminal in such a manner that the shop, vending machine owner, or chemist have no influence on the pricing. The calculation would be automatic.

One of the fields of consumption where world-wide agreed policies of Conservation may affect the pricing of goods, is fuel. It is very important for the economy that the basic needs of energy are available at a lowest possible cost since this reflects in prices and since prices determine wage levels, low energy costs appear to be vital for maintaining a non-inflationary economy. On the other hand, the dictates of a world household which has the needs of future generations in mind oblige everyone, including the administrators of economic measures, to accept higher prices for a v o i d a b l e energy use. The difficulty is to know when someone at a pump buys below or above his needs. A very closely defined estimation of a person's economic needs for a certain resource is of course impossible but even a coarse threshold allocation would be useful. If it were possible to arrange that petrol or fuel oil could be bought only with "electronic money", the administrative difficulty could easily be overcome and the cash registers at gasoline stations would automatically calculate agreed increments for preset levels of consumption increases over and above the basic need-norm. Dependent on the world political and economic situation, these increment steps may be only nominal at one time, or may be set at fairly substantial pricing steps at another time. Such practices may be applied to any household item or industrial ingredient at one time or another. The "electronic money purse" would also make it possible to differentiate between goods made in the country and imported goods, in such a manner that a person remains free to buy any item from any country of origin but the only restriction should relate to the ratio of purchases of foreign products to home-made products as evidenced over a period of say the last two months. This ratio would be automatically calculated within the "money purse" based on flags attached to individual purchases. Governments may prescribe a limit to these ratios dependent on the economic performance of the country and no person would be able to overstep that limit since the cash registers would refuse acceptance of payment for an imported item if the record in the money purse shows a ratio in excess of the official limit. Such customer would then have to look round for a home-made equivalent. It is clear that it would be a sheer insurmountable problem to keep track of a person's expenditures in order to assess the above named ratio. With the aid of the herein described electronic cash transfer system a fairly accurate assessment would be at any moment available and displayed to the user (if he so wishes) on the terminal Display Window upon pushing a button. The intent for providing the described facility would not at all be to suppress free choice but primarily to raise the awareness of the implications resulting from such free choice. What the combined efforts of political and economic information systems are today unable to provide, can now become a reality through the provision of a new payment means wherein an individual person's "purse" becomes the carrier of memory available to that person for self-evaluation of the purchaser's actions in the light of broader community-economic issues. A facility of this kind will therefore help to render superfluous crude measures through Government interference or coercion in order to seek to align personal trends with objective needs, and would therefore open a way for improved self-direction of human beings.

An example of the physical realisation of the *simpler form of the stored money token* (that is in accordance with FIGS. 4, 7 and 8) is shown in FIG. 12 wherein the sketch on the right is a cross section x—x of the figure on the left which is a longitudinal section of the token. The shell 180 of the component consists of two halves 180A and 180B. During assembly, the bottom half (180 A) is first used when the functional parts are laid into it and interconnected. After all solder connections are done, the top half B is placed over it and bonded at the flanges to fuse into a single piece. The internal parts are: a bobbin 182 made of ferrite ceramic with coil 191 whose ends are connected to the solder tags of the carrier 182 of the processor chip 190; a spacer disc which may also be a small capacitor (183); another bobbin of ferric ceramic 184 with coil of fine wire 192 whose wires are soldered to tags of component 185. The part 180 A has longitudinal recesses as the cross section shows, to protect the enamelled connecting wires. Finally, a battery 187 is pressed against the column of internal parts by means of a spring washer 186 and the end cap 181 screwed to the tubular part to seal it off. A hole 181a would enable the stored-money token to be kept on a key ring. To prevent playful users from unscrewing this end cap, one may bond or weld it to the main part along a seam 181b. The battery 187 which is required for maintaining the memory in the chip 190 may have to exchanged every second year or so. If this were to be done by the owner himself it would be necessary to provide two batteries in paralell in such a mounting configuration that only one of the batteries can be removed at the same time leaving the other in position until the first one is exchanged. By moving a cover flap, the second battery is exposed, removed and exchanged. If only one battery is used, the entire component might be exchanged by the supply organisation against another one, battery renewal being done in the workshops where also performance testing may be done before re-issue.

Another form of use would be to make the chip carrier 185 a throw-away component after the value is exhausted. In that case soldered connections cannot be used but the required six galvanic connections must be obtained by merely pushing the replacement chip carrier along grooves into the bottom of the tube to bear against bobbin 184. Some would see an advantage of this arrangement since no up-dating apparatus would be needed; the value component 185 would simply be sold at tobacco shops, stationaries, railway stations etc. and the customers would carry out their own insertions into the permanent component 180.

Finally, a method is to be described for reducing the initial acquisition cost of the stored money token. Such a reduction would be welcome to large numbers of potential users who may hesitate to pay $10 or $15 for a money token especially during the initial phase of a introduction when the possibility of using it may not yet be wide-spread.

This improvement can be implemented in the token circuitry of FIG. 7 and requires only a small addition to convert the device into a "pay as you pay" arrangement.

FIG. 11 shows a portion of the circuit of FIG. 7 in which the reader will recognize the gate 134, 146, 150 and 149 as well as the program counter 147, the value register 155 and auxiliary value register 155a. The additional elements consist of another counter 170 which enables has a decode section for decoding the, in instalments payable, part of the token acquisition price by means of NAND gate 171 During each debit cycle the counter 147 is stepped twice by means of a CK3-phased pulse. As long as the counter 170 has not reached the necessary value information, output from gate 171 is high. When it is reached, it goes low, disabling gate 172. That means that the value counter 155 will no longer receive the extra two count pulses during each debit cycle, i.e., payment of the token acquisition price is completed.

What I claim is:

1. An electronic money purse system using encrypted fund transfer signals comprising at least one central computer station, a variety of terminals at different locations and a multiplicity of electronically operated value storage carriers the circuit logic of which includes means for encrypting the data communicated to a terminal, the encrypting means including at least one cipher key register, a random data generator, and additional means for varying the spacing of data bits in a serial mixture of random data and transaction data wherein the data bit spacing is determined in dependence on the logic levels of selected bit positions of the cipher key register as well as on the sequentially appearing data to be transmitted from or being received in the said storage carrier.

2. An electronic money purse system using encrypted fund transfer signals as in claim 1 wherein the said data bit spacing varying means comprises a programmable counter whose parallel preset inputs are connected either to one particular selected set of parallel output positions of said cipher key register, or, to another particular selected set of parallel output positions of said cipher key register, and wherein a bistable flip flop is provided whose instant output condition is dependent on the instant parity level of at least part of said cipher key in said cipher key register in combination with at least one data bit, whereby the selection of one set of cipher key parallel bit outputs or the other set is made dependent on the status of said flip flop.

3. An electronic money purse system using encrypted fund transfer signals as in claim 2 further comprising a data buffer register and said at least one data bit is a parity bit for said cipher key register at any time said data buffer register presents data, such that said parity bit is supplied to said circuit logic with a predetermined delay.

4. An electronic money purse system using encrypted fund transfer signals as in claim 1 wherein said circuit logic includes data conversion circuits, said conversion circuits including decryption and encryption circuits which are connected to means for reactively coupling the value storage carrier to a terminal for transferring and receiving encrypted data.

5. An electronic money purse system using encrypted fund transfer signals as in claim 1, wherein said value storage carriers further comprises value register means for storing payment value units from which such units can be deducted in debiting operations, and are receptive to a signals from said terminal and said central computer whereby the said value storage carrier becomes receptive for value-crediting operations by further comprising a value-crediting circuit including a value-add access code register which, upon being correctly addressed, must produce an Enable voltage to enable said value register means to be incremented.

6. An electronic money purse system using encrypted fund transfer signals as in claim 5 in which said value-add access code register is associated with a first address register, and said terminal further comprising means for receiving the address of said address register in order to select from a set of available value-add access codes the one which matches the access code stored in said access code register of said value storage carrier.

7. An electronic money purse system using encrypted fund transfer signals as in claim 6 wherein the said value-add access code for enabling crediting operations in said value storage carrier is also used as a cipher key for encrypting transaction data associated with the said crediting operation.

8. An electronic money purse system as in claim 1 wherein the said cipher key used for debiting operations is also associated with a second address register holding the address for cipher said key in the terminal memory circuit, and wherein means are provided in the terminal unit for receiving said address code and for enabling the addressed key memory locations for the consecutive cipher/decipher operations of the transaction data.

9. An electronic money purse system in claim 3, further comprising a means for testing the state of operational effectiveness of a data transfer coupling between said value storage carrier and said terminal including a random number generator provided in said terminal, for sending and circulating a random number signal through a terminal encryption path to said value storage carrier encryption path, said carrier encryption path including a decryption circuit, to said data buffer register, and from there back through a encryption circuit to a terminal decryption circuit for comparison in a comparator circuit; and means for producing a transaction enablement signal after an uninterruptedly correct repetition of the said random number signal transfer by a preset number of times.

10. An electronic money purse system as in claim 5 wherein said value-crediting circuit further comprises a first identification means for producing a readout from memory locations in said value storage carrier to convey identification data including;

(a) a serial number of the data carrier
(b) a total number of update transactions, and
(c) particulars of the most recent update transaction;
and means in said terminal and means in central computer station for holding a record of said identification data, and further means for receiving said identification data transferred from the said value storage carrier, and means in said central computer station for generating a default signal to prevent the continued use of said value storage carrier.

11. An electronic money purse system as in claim 10 wherein said terminal further comprises a relay actuatable by a signal from a central computer station for detaching an interface connection between said value storage carrier and said terminal and; means for directly communicating debiting functions between said central computer station and said value storage carrier which normally would have been carried out by said terminal, said central computer station comprises a second identification means similar to said first identification means in said terminal which will either accept the value storage carrier or emit a card capture signal said terminal to receive said card capture signal and to respond by capturing said value storage carrier.

12. An electronic money purse system as in claim 1 wherein said value storage carrier includes push buttons for entering data into a memory location of said value storage carrier.

13. An electronic money purse system as in claim 12 wherein said value storage carrier includes a display window for displaying data entered via said push buttons, or the status of any selected register in said value storage carrier.

14. An electronic money purse system as in claim 1 wherein said circuit logic is placed on a single semiconductor substrate.

15. An electronic money purse system as in claim 1 wherein value storage carrier comprises memory locations for holding totals of quantities of goods for which an item code has been entered, and an updating circuit which, after each transaction, produces a new total relative to a predetermined period, and means for reading out said totals and for displaying said totals in said terminal unit.

16. An electronic money purse system as in claim 15 wherein said value storage carrier further comprises memory locations which can be loaded, via a terminal, with data relating to thresholds for various totals for goods over the said predetermined period, further comprising means for providing a percentual price increase factor which corresponds to a comparison of the actual purchase total with a threshold, and means in the terminal to calculate a modified price and to debit it from said value storage carrier in accordance with said price increase factor and means to display the said totals and the associated price increase factor.

17. An electronic money purse system comprising a multiplicity of pocket-size personal electronic value storage carriers and at least one terminal for reading out data from said storage carriers and for exchanging data between said terminal and said storage carriers both said storage carrier and said terminal comprising electronic registers and data processors which, when placed into operative relationship, work in synchronism with each other, and encryption circuits and decipher circuits for the encryption and deciphering of data, said terminal further comprising a random data generator for generating test data, means for sending said test data of a definite bit length a number of times, prior to the transfer of any transaction data, through said encryption circuit of said terminal, over an interface means to said decipher circuit of said storage carrier to recover the said test signal in clear form and for transferring it back to the terminal thorough encryption circuit of said storage carrier and said decipher circuit of said terminal for comparison with the initial test data, and means for producing a transaction circuit enable signal after an uninterrupted correct repetition of the said signal transfer by a present number of times.

18. An electronic money purse system using encrypted fund transfer signals, comprising:
at least one terminal; and
a plurality of value storage carriers, each of said carriers including means for encryption of data communicated to a terminal, said encryption means comprising at least one cipher key register for registering a cipher key and a random data generator whereby the spacing of transaction data is varied by a serial mixture of random data in accordance with logic levels of selected bit positions of said cipher key register and sequential data to be exchanged with said value storage carrier.

19. An electronic money purse system according to claim 18, wherein;
said encrypting means further comprises a programmable counter having parallel inputs connected to one or another preselected set of parallel outputs of said cipher key register, and a bistable flip-flop circuit the output status of which is dependent on the parity level of at least part of said cipher key register with at least one transaction data bit, whereby the selection of one of said preselected parallel output sets is dependent on the output status of said flip-flop circuit.

20. An electronic money purse system according to claim 19, wherein said encryption means further comprises;
a data buffer register for delaying said at least one data transaction bit to be used to check parity.

21. An electronic money purse system according to claim 18, said value storage carrier further comprises:
means for reactively coupling said value storage carrier to one of said terminals to enable exchange of encrypted data; and
said encryption means further comprises data conversion circuits connected to said coupling means for encrypting and deciphering transaction data.

22. An electronic money purse system according to claim 18, further comprising:
at least one central computer station; and,
said value storage carriers further comprises means for registering payment value units from which such units can be deducted in debiting operations and incremented in value credited operations, wherein said payment value registering means includes an access code register which, upon being addressed by said terminal or said central computer, produces an enable signal to enable said payment value registering means to be incremented.

23. An electronic money purse system according to claim 22, wherein:
said payment value registering means further comprises first address register in association with said access code register; and
said terminals further comprise means for receiving the address of said first address register in order to retrieve from a set of access codes one that matches the access code of said access code register in said value storage carrier.

24. An electronic money purse system according to claim 23 wherein:
said access code for enabling value credited operations in the payment value registering means is additionally used as the cipher key for encrypting the exchange of transaction data associated with said crediting operation.

25. An electronic money purse system according to claim 18, wherein:
said encryption means further comprises a second address register, in association with said cipher key register, for storing the address code of the cipher key in said register; and,
said terminal further comprises means for receiving said address code and for enabling the cipher keys addressed in said cipher key register to effect consecutive cipher/decipher operations of transaction data.

26. An electronic money purse system according to claim 18, wherein:
said terminal further comprises a communications integrity testing circuit, including a random number generator, for sending and circulating at least one random number through encryption means of said terminal to a decryption means, a data buffer register and said encryption means of said value storage carrier back through a decryption means of said terminal for comparison in a comparator circuit, and means for producing a transaction enablement signal after an uninterrupted correct repetition of said random number a preselected number of times.

27. An electronic money purse system according to claim 22, wherein:
said payment value registering means stores and outputs identification data including a serial number identifying the particular value storage carrier, a number corresponding to the total number of update transactions and particulars of the most recent update transaction; and
said terminal and said central computer station further comprising means for storing substantially similar identification data and means for receiving identification data from said payment value registering means, and means for generating a default signal to prevent continued use of said value storage carrier in the event that the identification data does not match.

28. An electronic money purse system according to claim 27, wherein:
said terminal further comprises a relay actuatable by a signal from said central computer station for detaching a reactive coupling between said value storage carrier and said terminal so that said central computer station communicates directly with said value storage carrier to identify the value storage carrier and carry out debiting functions; and,
central computer station further comprising means to generate a capture signal to prompt means in said terminal for retaining said value storage carrier, without performing a debiting operation, in the event that the central computer station fails to identify said value storage carrier.

29. An electronic money purse system according to claim 18, wherein:
said value storage carrier further comprises data entry buttons for entering data into memory locations.

30. An electronic money purse system according to claim 29, wherein:
said value storage carrier further comprises a display window for displaying data entered via data entry buttons and/or the status of any selected register in said value storage carrier.

31. An electronic money purse system according to claim 18 wherein at least the circuitry of the encryption means is contained on a single semiconductor substrate.

32. An electronic money purse system according to claim 18, wherein:
said value storage carrier further comprises means for storing totals of quantities of goods for which an item code has been entered, a means for updating said totals after each transaction and means for reading said totals and for displaying said totals in said terminal unit.

33. An electronic money purse system according to claim 32, wherein:
said value storage carrier further comprises memory means for storing maximum purchasing thresholds on selected commodities and for providing an increased price factor when said thresholds are exceeded, means for calculating a modified price in accordance with said increased price factor and said means for displaying said totals further displaying increased price factor.

34. An electronic money purse system comprising:
a plurality of pocket-size personal electronic value storage carriers including first decipher means for deciphering encrypted transaction data, first register means for selectively storing said deciphered transaction data, first data processor means for processing said transaction data, first cipher means for encrypting processed transaction data and interface means for exchanging data with external units;
at least one terminal including second decipher means for deciphering encrypted transaction data, second register means for selectively storing transaction data, second data processor means for processing said deciphered transaction data, second cipher means for encrypting data, second interface means for exchanging data with external units, a random data generator means for generating random data strings, and means for sending test data of defined bit length a predetermined number of times, prior to exchange of transactional data, through second means, over second and first interface means to first decipher means to thereafter be sent through first cipher means, over first and second interface means to said second decipher means for comparison with initial test data, and means for generating a transaction enable signal in response to a series of accurate comparisons of exchanged test data to initial test data.

35. A value storage carrier comprising:
a decipher means for deciphering encrypted transaction data input from an external device;
arithmetic means for processing transaction data deciphered by said decipher circuit; and,
encryption means for encrypting transaction data from said arithmetic means to be output to said external device.

36. A value storage carrier according to claim 35, wherein:
said encryption means includes a random data generator for introducing random data to said transaction data and thereby encrypt said transaction data;
said decipher means including alterable memory means for storing a cipher key, said cipher key controlling the deciphering of said encrypted transaction data.

37. A value storage carrier according to claim 35, further comprising:
means for reactively coupling said value storage carrier to said external device.

38. A value storage carrier according to claim 36, wherein:
said encryption means further comprises a programmable counter electronically coupled to a control logic circuit, said logic circuit electronically coupled to the cipher key memory means.

39. A value storage carrier according to claim 35, further comprising:
means for counting the number of unsuccessful attempts to access the arithmetic means;
means for storing and outputting data corresponding to details of the latest data transaction; and,
means for storing a carrier identifying serial number.

40. A value storage carrier according to claim 35, further comprising:
means for performing debit or credit operations, and said arithmetic means further comprises a value register for updating the total number of value units remaining after a debit or credit operation.

41. An electronic money purse system as in claim 1, wherein, said value storage carrier further comprises:
means for additionally debiting a fractional amount of an initial acquisition cost of said value storage carrier during a fund transfer operation.

42. An electronic money purse system as in claim 18, wherein, said value storage carrier further comprises:
means for additionally debiting a fractional amount of an initial acquisition cost of said value storage carrier during a fund transfer operation.

43. An electronic money purse system according to claim 32, wherein said value storage carrier further comprises:
data entry buttons for entering and accessing data stored in memory locations;
display means for displaying information data entered or accessed by said data entry buttons, wherein said means for storing totals of quantities of goods additionally stores time and date information and data stored in said means for storing totals of quantities of goods is accessed by said data-entry buttons and displayed on said display means.

* * * * *